US012683184B2

(12) United States Patent
Ishihara

(10) Patent No.: US 12,683,184 B2
(45) Date of Patent: Jul. 14, 2026

(54) BATTERY CELL CONNECTION STRUCTURE

(71) Applicant: HONDA MOTOR CO., LTD., Tokyo (JP)

(72) Inventor: Yuya Ishihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 605 days.

(21) Appl. No.: 18/148,054

(22) Filed: Dec. 29, 2022

(65) Prior Publication Data

US 2023/0223583 A1 Jul. 13, 2023

(30) Foreign Application Priority Data

Jan. 7, 2022 (JP) ................................. 2022-001540

(51) Int. Cl.
*H01M 10/04* (2006.01)
*H01M 50/517* (2021.01)
*H01M 4/02* (2006.01)

(52) U.S. Cl.
CPC ..... *H01M 10/0445* (2013.01); *H01M 50/517* (2021.01); *H01M 2004/027* (2013.01); *H01M 2004/028* (2013.01)

(58) Field of Classification Search
CPC ............. H01M 10/04; H01M 10/0445; H01M 50/517; H01M 2004/027; H01M 2004/028
USPC ....................................................... 429/163
See application file for complete search history.

(56) References Cited

U.S. PATENT DOCUMENTS

2012/0276773 A1 11/2012 Abraham et al.
2014/0147729 A1* 5/2014 Moon et al. ........ H01M 50/516
429/158

FOREIGN PATENT DOCUMENTS

| JP | 2008-181765 A | 8/2008 |
| JP | 2008-186725 A | 8/2008 |
| JP | 2011-198660 A | 10/2011 |
| JP | 2013-514611 A | 4/2013 |

OTHER PUBLICATIONS

Japanese Office Action dated Oct. 28, 2025 issued in corresponding Japanese application No. 2022-001540; English machine translation included (8 pages).

* cited by examiner

*Primary Examiner* — Kevin P Kerns
(74) *Attorney, Agent, or Firm* — Rankin, Hill & Clark LLP

(57) ABSTRACT

In a battery cell connection structure for connecting two rectangular battery cells in series in a state where the two battery cells are stacked in the thickness direction thereof, a positive electrode tab of one of the battery cells and a negative electrode tab of the other of the battery cells are connected to each other in a state where the positive electrode tab and the negative electrode tab are stacked in the thickness direction while the positive electrode tab and the negative electrode tab are inclined with respect to a direction in which the two battery cells are stacked.

8 Claims, 15 Drawing Sheets

FIG. 6

BATTERY CELL CONNECTION STRUCTURE

CROSS-REFERENCE TO RELATED APPLICATIONS

This application is based upon and claims the benefit of priority from Japanese Patent Application No. 2022-001540 filed on Jan. 7, 2022, the contents of which are incorporated herein by reference.

BACKGROUND OF THE INVENTION

Field of the Invention

The present invention relates to a battery cell connection structure.

Description of the Related Art

JP 2008-186725 A discloses a battery cell connection structure. In this battery cell connection structure, an electrode of a battery cell and an electrode of another battery cell are fastened to each other by a screw.

SUMMARY OF THE INVENTION

The technique disclosed in JP 2008-186725 A has a problem in that a gap is generated between the battery cells, when the thickness of the battery cell is relatively thin with respect to the screw.

An object of the present invention is to solve the above-mentioned problem.

According to an aspect of the present invention, provided is a battery cell connection structure configured to connect two battery cells each having a rectangular shape in series in a state where the two battery cells are stacked in a thickness direction thereof, wherein a positive electrode tab and a negative electrode tab are provided on a first side of a plurality of sides of each of the battery cells, the two battery cells are stacked in a state where the first sides thereof are oriented in a same direction, the positive electrode tab of one of the battery cells and the negative electrode tab of another of the battery cells are connected to each other in a state of being stacked in the thickness direction, and the positive electrode tab of the one of the battery cells and the negative electrode tab of the other of the battery cells are connected to each other in a state of being stacked in the thickness direction while the positive electrode tab and the negative electrode tab are bent to be inclined with respect to a direction in which the two battery cells are stacked and with respect to a direction in which the first side of each of the battery cells is connected to a second side of each of the battery cells, the second side being opposite from the first side.

According to the present invention, the distance between the battery cells can be shortened.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a cross-sectional view of the battery cell stack and the heat exchanger.

DETAILED DESCRIPTION OF THE INVENTION

First Embodiment

[Configuration of Battery Module]

Figure 1:
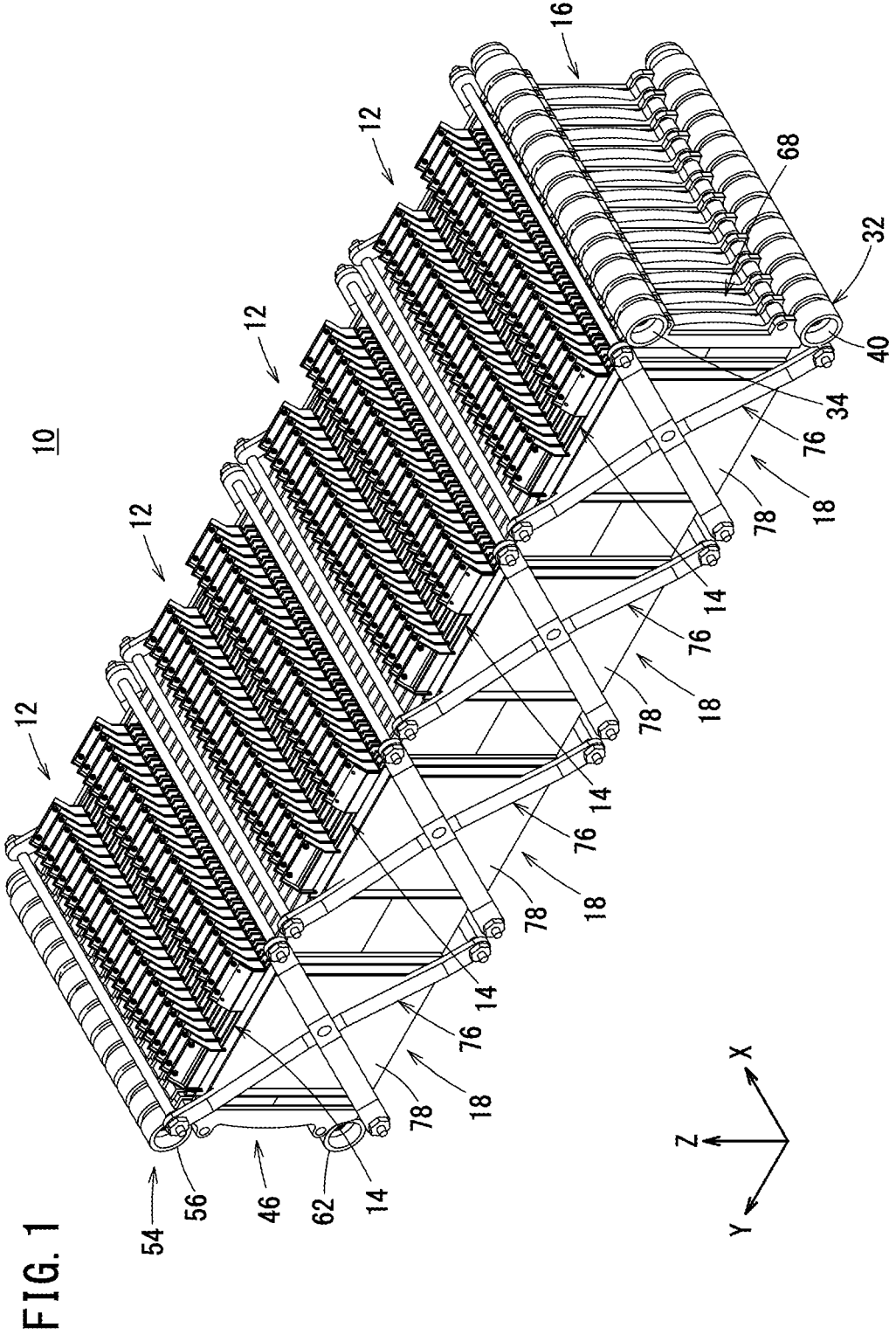
FIG. 1 is a perspective view of a battery module.

FIG. 1 is a perspective view of a battery module 10. In the following description of the structure of each member constituting the battery module 10, the description will be made using the directions and orientations of the X axis, the Y axis, and the Z axis indicated by the arrows in FIG. 1. Arrows indicating the X-axis, the Y-axis, and the Z-axis are also illustrated in the drawings other than FIG. 1, which will be described later. The directions and orientations of the X-axis, the Y-axis, and the Z-axis indicated by the arrows in the drawings other than FIG. 1 correspond to the directions and orientations of the X-axis, the Y-axis, and the Z-axis indicated by the arrows in FIG. 1.

The battery module 10 includes four battery cell stacks 12. The four battery cell stacks 12 are arranged in the Y-axis direction in a state where the longitudinal direction of each battery cell stack 12 is oriented in the X-axis direction. Each battery cell stack 12 includes a plurality of battery cells 14. In each battery cell stack 12, the plurality of battery cells 14 are stacked side by side in the X-axis direction. That is, the stacking direction of the battery cells 14 is the same as the X-axis direction. The battery cells 14 are stacked in the thickness direction thereof. In each battery cell stack 12, each battery cell 14 is connected in series with another battery cell 14.

The battery module 10 includes a heat exchanger 16. The heat exchanger 16 cools each battery cell 14.

The battery module 10 includes four battery frames 18. Each battery frame 18 holds each battery cell stack 12. Each battery frame 18 applies pressure to the battery cell stack 12 from both sides in the X-axis direction. Thus, expansion of each battery cell 14 is suppressed.

[Configuration of Battery Cell]

Figure 2:
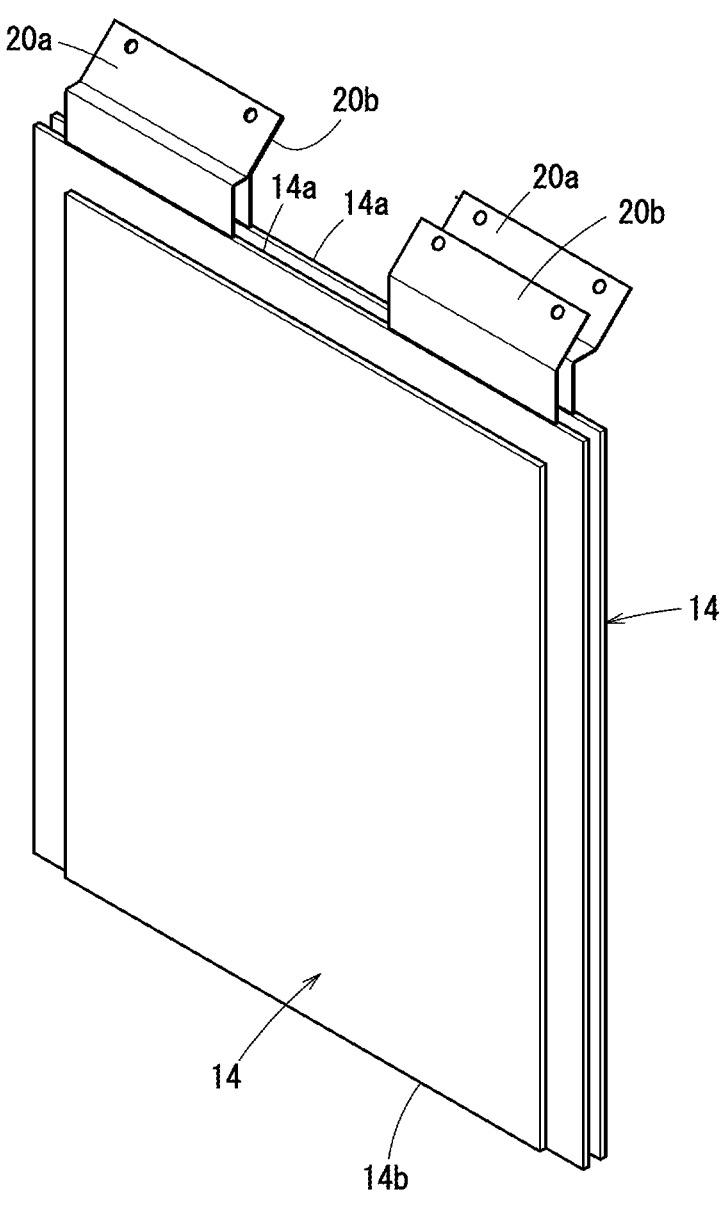
FIG. 2 is a perspective view of a battery cell.
Figure 2:
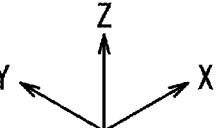

FIG. 2 is a perspective view of the battery cell 14. FIG. 2 shows a state in which two battery cells 14 are stacked.

The battery cell 14 is a laminated battery. The battery cell 14 is formed in a rectangular plate shape. The battery cell 14 is provided with a positive electrode tab 20a and a negative electrode tab 20b. The positive electrode tab 20a and the negative electrode tab 20b are provided on a first side 14a of a plurality of sides of the battery cell 14. The positive electrode tab 20a is formed in a rectangular plate shape. The negative electrode tab 20b is formed in a rectangular plate shape.

[Configuration of Heat Exchanger]

Figure 3:
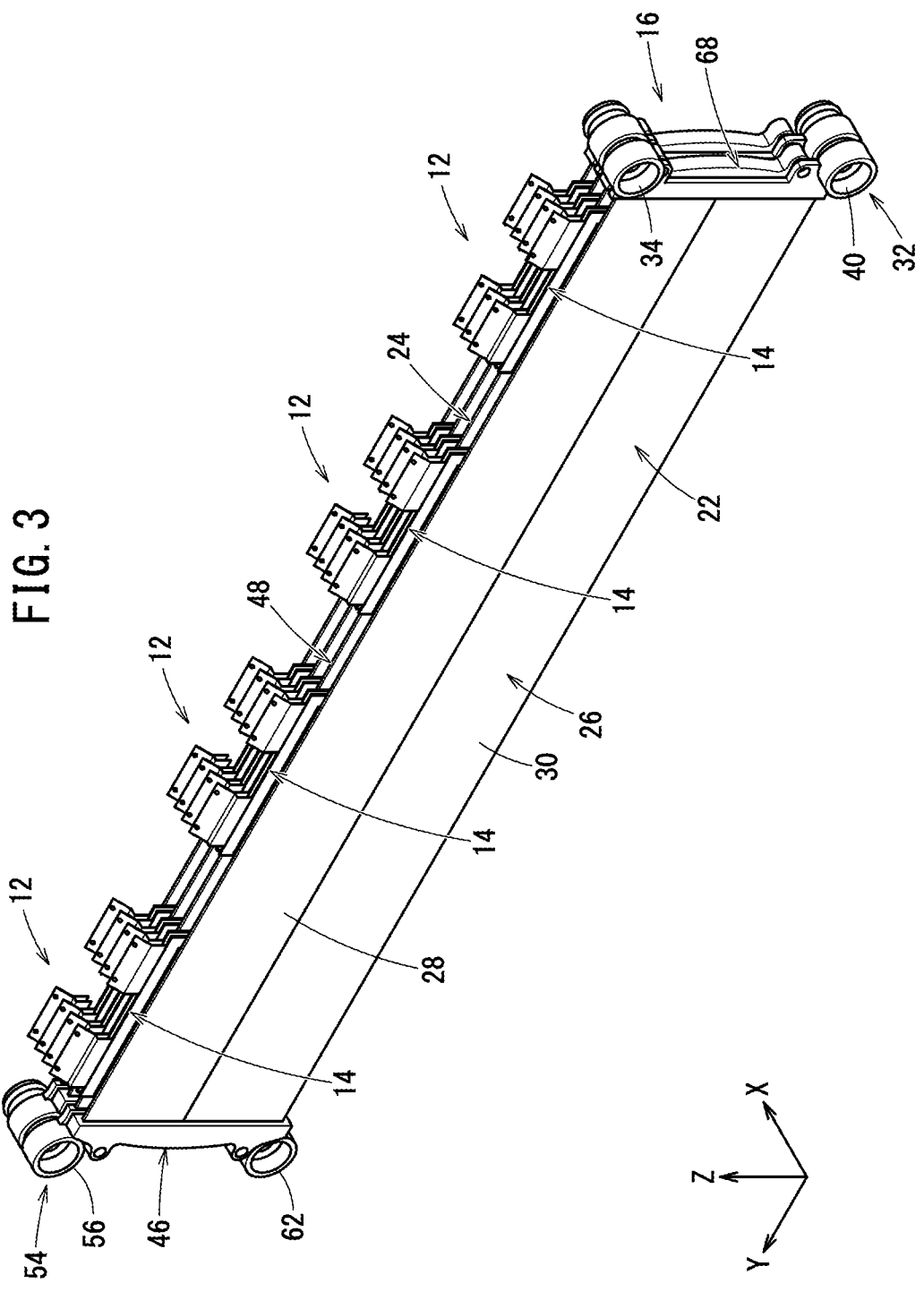
FIG. 3 is a perspective view of a battery cell stack and a heat exchanger.
Figure 4:
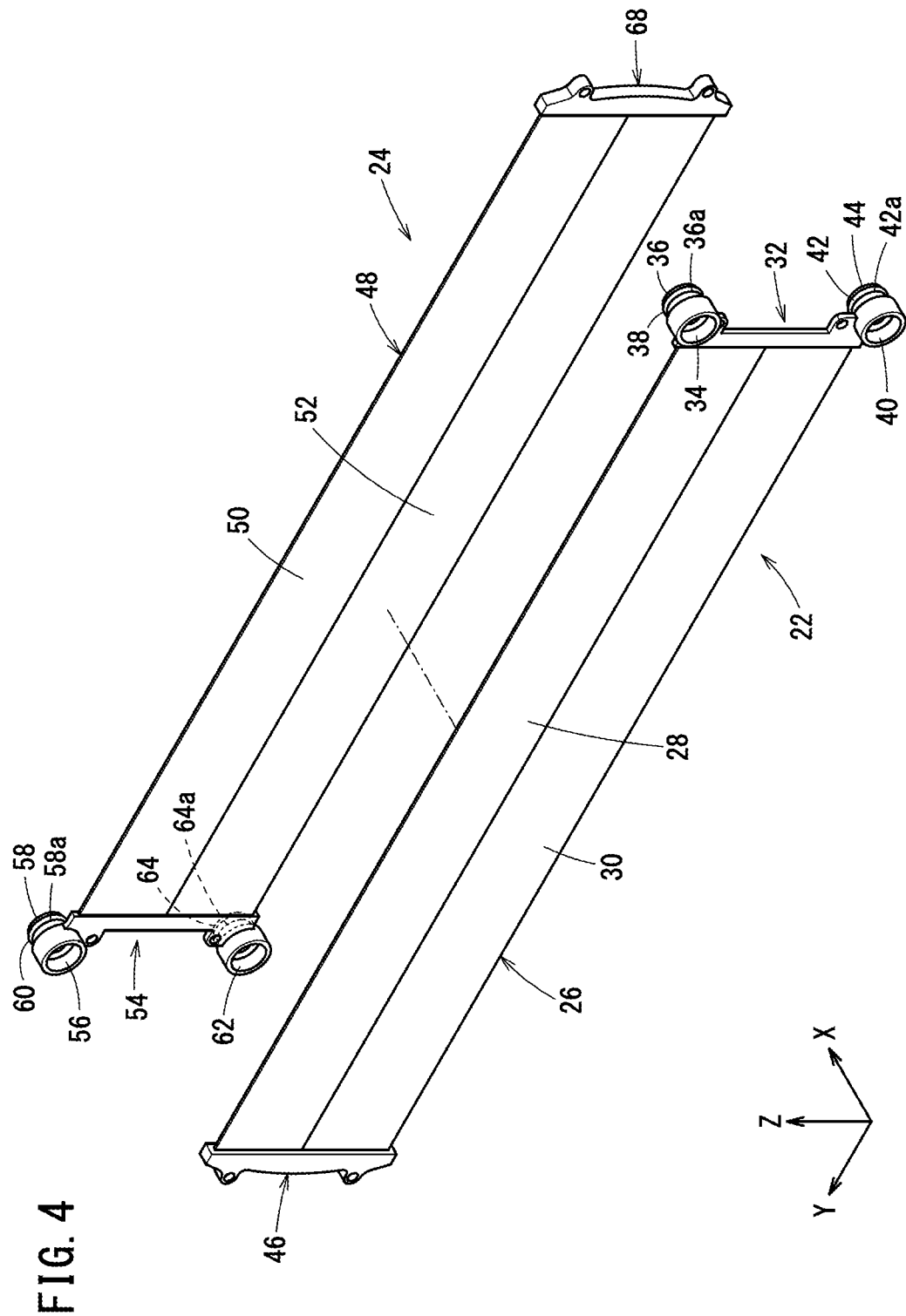
FIG. 4 is a perspective view of a first heat exchange plate and a second heat exchange plate.
Figure 5:
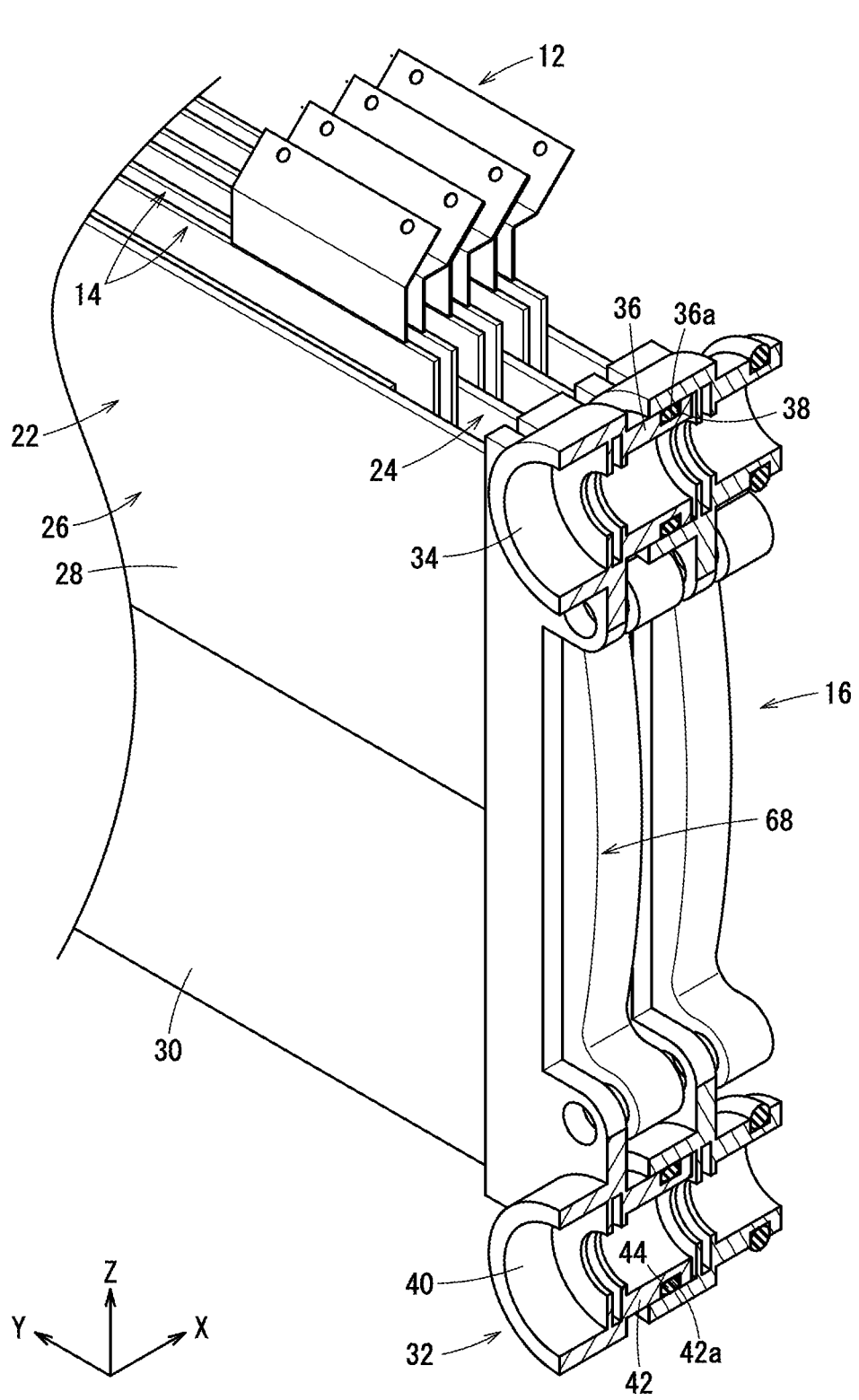
FIG. 5 is a cross-sectional perspective view of the battery cell stack and the heat exchanger.
Figure 6:
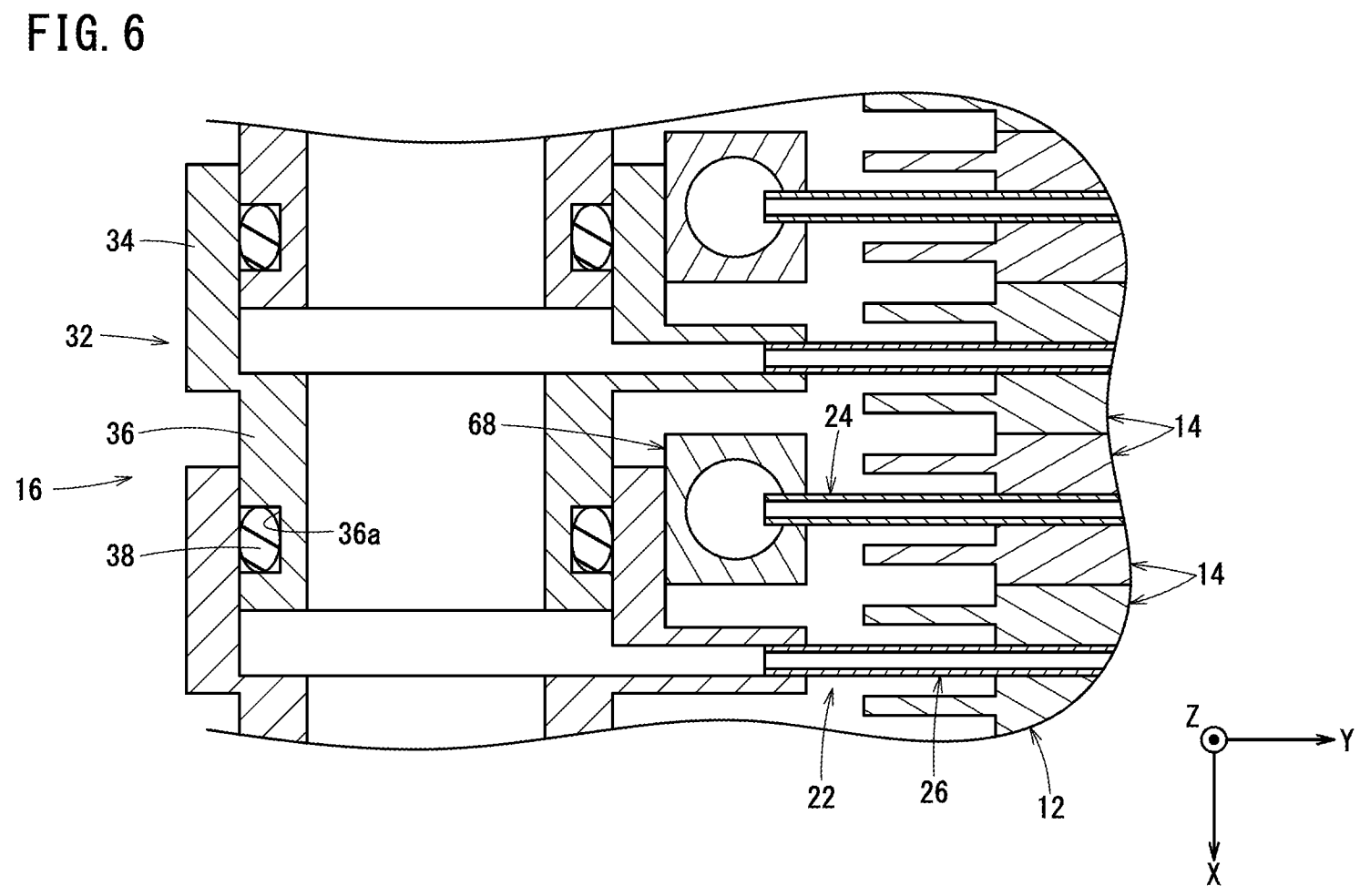

FIG. 3 is a perspective view of the battery cell stack 12 and the heat exchanger 16. In FIG. 3, a part of the battery cell stack 12 and a part of the heat exchanger 16 are illustrated. FIG. 4 is a perspective view of a first heat exchange plate 22 and a second heat exchange plate 24. FIG. 5 is a cross-sectional perspective view of the battery cell stack 12 and the heat exchanger 16. In FIG. 5, a part of the battery cell stack 12 and a part of the heat exchanger 16 are illustrated. FIG. 6 is a cross-sectional view of the battery cell stack 12 and the heat exchanger 16. In FIG. 6, a part of the battery cell stack 12 and a part of the heat exchanger 16 are illustrated.

The heat exchanger 16 includes a plurality of the first heat exchange plates 22 and a plurality of the second heat exchange plates 24. The plurality of first heat exchange plates 22 and the plurality of second heat exchange plates 24 are stacked side by side in the X-axis direction. The plurality of first heat exchange plates 22 and the plurality of second heat exchange plates 24 are stacked in the thickness direction of the first heat exchange plates 22 and the thickness direction of the second heat exchange plates 24. The plurality of first heat exchange plates 22 and the plurality of second heat exchange plates 24 are configured such that the first heat exchange plate 22 and the second heat exchange plate 24 are alternately stacked.

The structure of the second heat exchange plate 24 is the same as that of the first heat exchange plate 22. In the heat exchanger 16, the direction in which the first heat exchange plate 22 is disposed is different from the direction in which the second heat exchange plate 24 is disposed.

The first heat exchange plate 22 includes a first water jacket 26. The longitudinal direction of the first water jacket 26 extends in the Y-axis direction. The first water jacket 26 includes a first forward flow path 28 and a first return flow path 30. In the Z-axis direction, the first forward flow path 28 is provided on the Z-axis positive side of the center of the first water jacket 26. In the Z-axis direction, the first return flow path 30 is provided on the Z-axis negative side of the center of the first water jacket 26. Cooling water flows inside the first forward flow path 28. The cooling water flows through the first forward flow path 28 from the negative side in the Y-axis direction toward the positive side in the Y-axis direction. The cooling water flows inside the first return flow path 30. The cooling water flows through the first return flow path 30 from the positive side in the Y-axis direction toward the negative side in the Y-axis direction. That is, the Y-axis direction is the same as the flow direction in which the cooling water flows inside the first water jacket 26.

The first heat exchange plate 22 includes a first water supply/discharge header 32. The first water supply/discharge header 32 is attached to an end portion of the first water jacket 26 on the negative side in the Y axis direction. The first water supply/discharge header 32 includes a first water supply inlet 34 for supplying cooling water to the first forward flow path 28. The first water supply inlet 34 includes a first water supply connection portion 36. The first water supply connection portion 36 is inserted into the first water supply inlet 34 of another first heat exchange plate 22 located on the positive side in the X-axis direction. The first water supply connection portion 36 includes a seal groove 36a. A seal member 38 is attached to the seal groove 36a. The first water supply/discharge header 32 includes a first water discharge outlet 40 for discharging the cooling water from the first return flow path 30. In the Y-axis direction, the first water discharge outlet 40 is disposed on the same side of the first water jacket 26 as the first water supply inlet 34. The first water discharge outlet 40 includes a first water discharge connection portion 42. The first water discharge connection portion 42 is inserted into the first water discharge outlet 40 of another first heat exchange plate 22 located on the positive side in the X-axis direction. The first water discharge connection portion 42 includes a seal groove 42a. A seal member 44 is attached to the seal groove 42a.

The first heat exchange plate 22 includes a first turn header 46. The first turn header 46 is attached to an end portion of the first water jacket 26 on the positive side in the Y-axis direction. Thus, the first turn header 46 is disposed on the opposite side of the first water jacket 26 from the first water supply inlet 34 and the first water discharge outlet 40. The first turn header 46 causes the cooling water flowing from the first forward flow path 28 to flow to the first return flow path 30. The first turn header 46 is formed in a curved surface shape protruding toward the outer side of the first heat exchange plate 22 in the Y-axis direction. As a result, the first turn header 46 can smoothly change the direction of flow of the cooling water flowing from the first forward flow path 28 and cause the cooling water to flow to the first return flow path 30.

The second heat exchange plate 24 includes a second water jacket 48. The longitudinal direction of the second water jacket 48 extends in the Y-axis direction. The second water jacket 48 includes a second forward flow path 50 and a second return flow path 52. In the Z-axis direction, the second forward flow path 50 is provided on the Z-axis positive side of the center of the second water jacket 48. In the Z-axis direction, the second return flow path 52 is provided on the Z-axis negative side of the center of the second water jacket 48. Cooling water flows inside the second forward flow path 50. The cooling water flows through the second forward flow path 50 from the positive side in the Y-axis direction toward the negative side in the Y-axis direction. The cooling water flows inside the second return flow path 52. The cooling water flows through the second return flow path 52 from the negative side in the Y-axis direction toward the positive side in the Y-axis direction. That is, the Y-axis direction is the same as the flow direction in which the cooling water flows inside the second water jacket 48.

The second heat exchange plate 24 includes a second water supply/discharge header 54. The second water supply/discharge header 54 is attached to an end portion of the second water jacket 48 on the positive side in the Y axis direction. The second water supply/discharge header 54 includes a second water supply inlet 56 for supplying cooling water to the second forward flow path 50. In the Y-axis direction, the second water supply inlet 56 is provided on the opposite side of the first water jacket 26 and the second water jacket 48 from the first water supply inlet 34. The second water supply inlet 56 includes a second water supply connection portion 58. The second water supply connection portion 58 is inserted into the second water supply inlet 56 of another second heat exchange plate 24 located on the positive side in the X-axis direction. The second water supply connection portion 58 includes a seal groove 58a. A seal member 60 is attached to the seal groove 58a. The second water supply/discharge header 54 includes a second water discharge outlet 62 for discharging the cooling water from the second return flow path 52. In the Y-axis direction, the second water discharge outlet 62 is disposed on the same side of the second water jacket 48 as the second water supply inlet 56. In the Y-axis direction, the second water discharge outlet 62 is provided on the opposite side of the first water jacket 26 and the second water jacket 48 from the first water discharge outlet 40. The second water discharge outlet 62 includes a second water discharge connection portion 64. The second water discharge connection portion 64 is inserted into the second water discharge outlet 62 of another second heat exchange plate 24 located on the positive side in the X-axis direction. The second water discharge connection portion 64 includes a seal groove 64a. A seal member (not shown) is attached to the seal groove 64a.

The second heat exchange plate 24 includes a second turn header 68. The second turn header 68 is attached to an end portion of the second water jacket 48 on the negative side in the Y-axis direction. Thus, the second turn header 68 is disposed on the opposite side of the second water jacket 48 from the second water supply inlet 56 and the second water discharge outlet 62. The second turn header 68 causes the cooling water flowing from the second forward flow path 50 to flow to the second return flow path 52. The second turn header 68 is formed in a curved surface shape protruding toward the outer side of the second heat exchange plate 24 in the Y-axis direction. As a result, the second turn header 68 can smoothly change the direction of flow of the cooling water flowing from the second forward flow path 50 and cause the cooling water to flow to the second return flow path 52.

Figure 7:
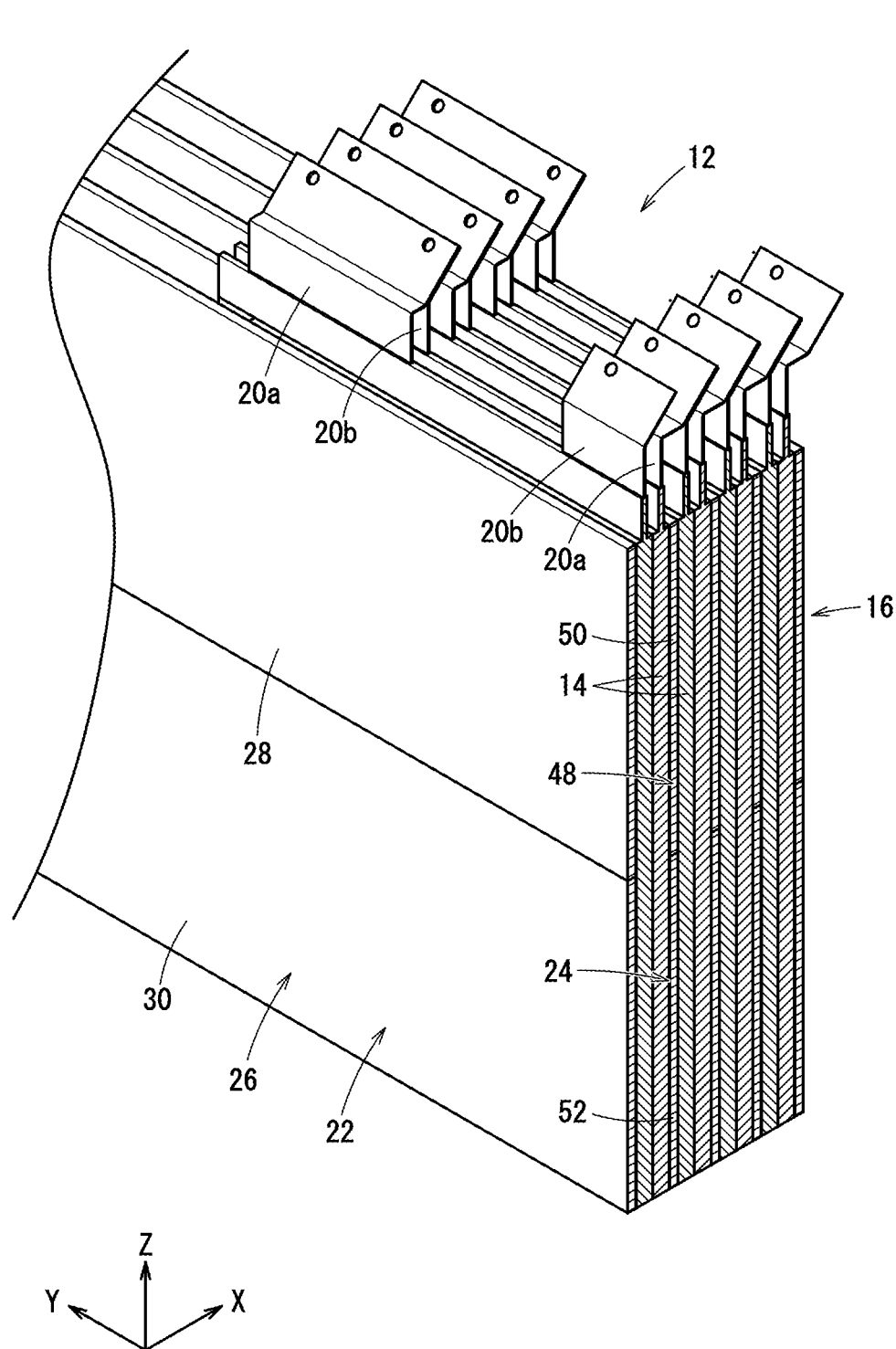
FIG. 7 is a cross-sectional perspective view of the battery cell stack and the heat exchanger.

FIG. 7 is a cross-sectional perspective view of the battery cell stack 12 and the heat exchanger 16. In FIG. 7, a part of the battery cell stack 12 and a part of the heat exchanger 16 are illustrated.

Two battery cells 14 are disposed between the first heat exchange plate 22 and the second heat exchange plate 24 in the X-axis direction. The two battery cells 14 are stacked in the thickness direction. Each of the outer surfaces of the two stacked battery cells 14 is in direct contact with the first water jacket 26 of the first heat exchange plate 22 or the second water jacket 48 of the second heat exchange plate 24. Each battery cell 14 is disposed between the first heat exchange plate 22 and the second heat exchange plate 24 in a state where the positive electrode tab 20a and the negative electrode tab 20b face the positive side in the Z-axis direction.

[Battery Cell Connection Structure]

Figure 8:
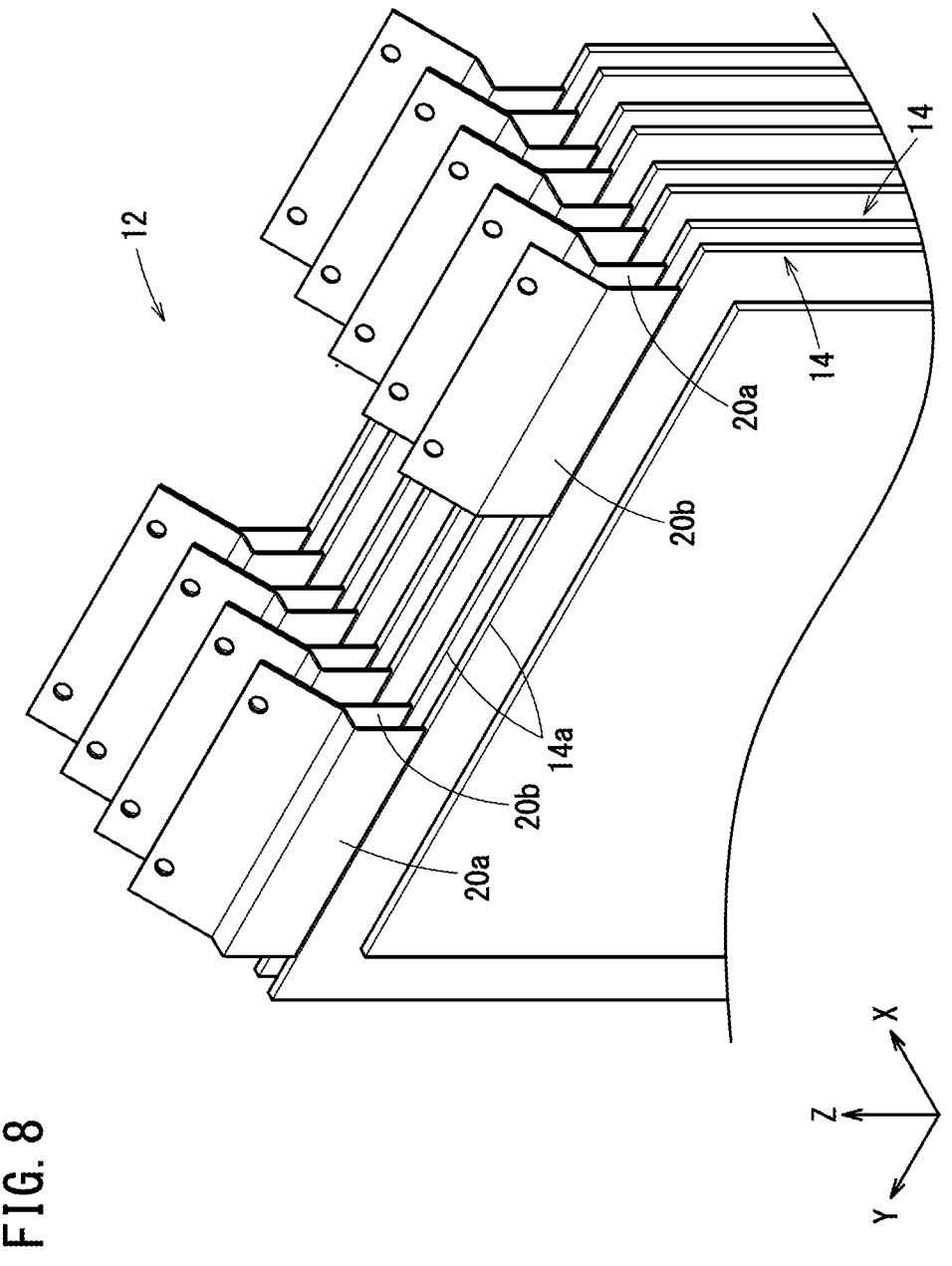
FIG. 8 is a perspective view of the battery cell stack.
Figure 9:
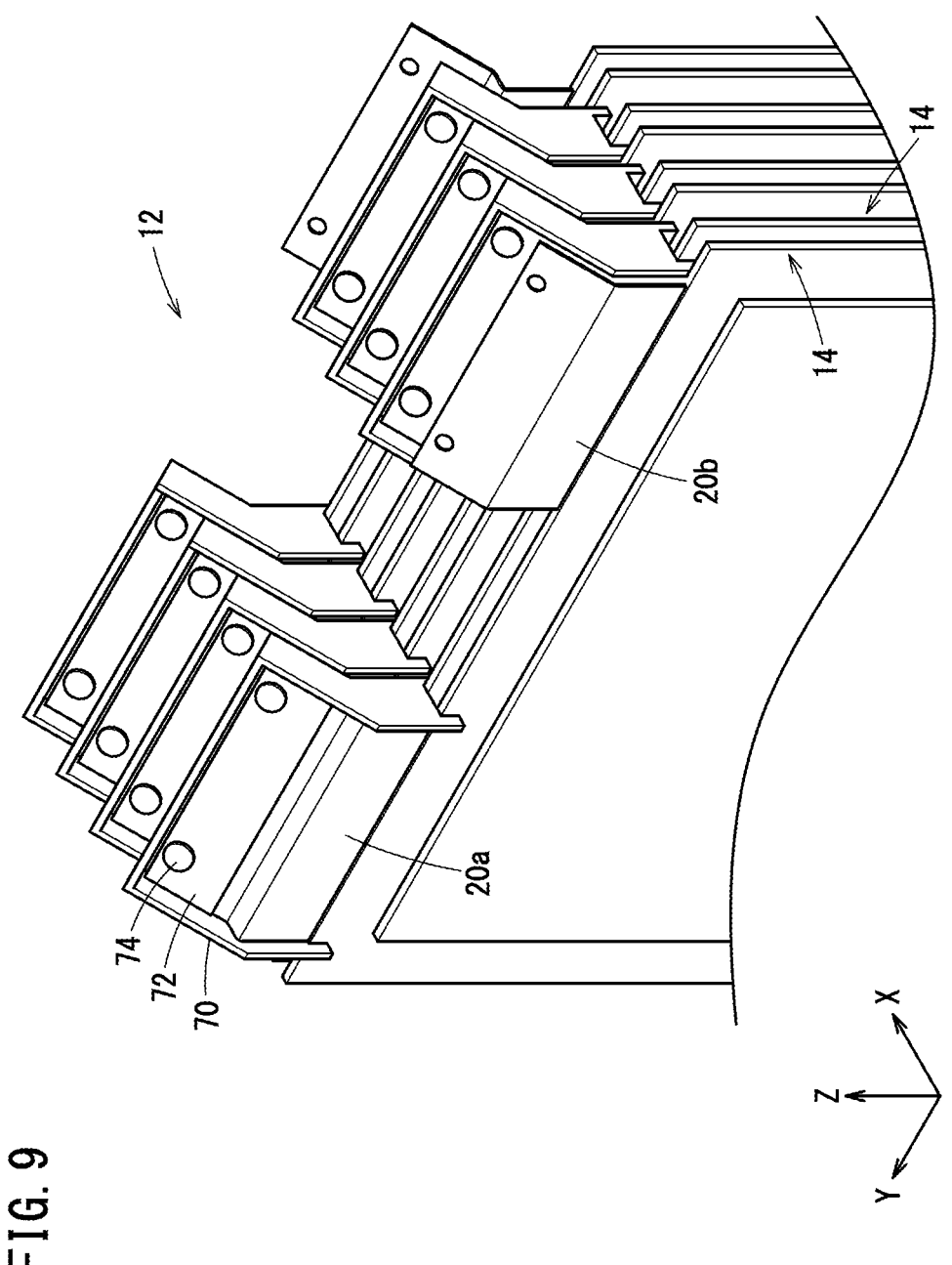
FIG. 9 is a perspective view of the battery cell stack.
Figure 10:
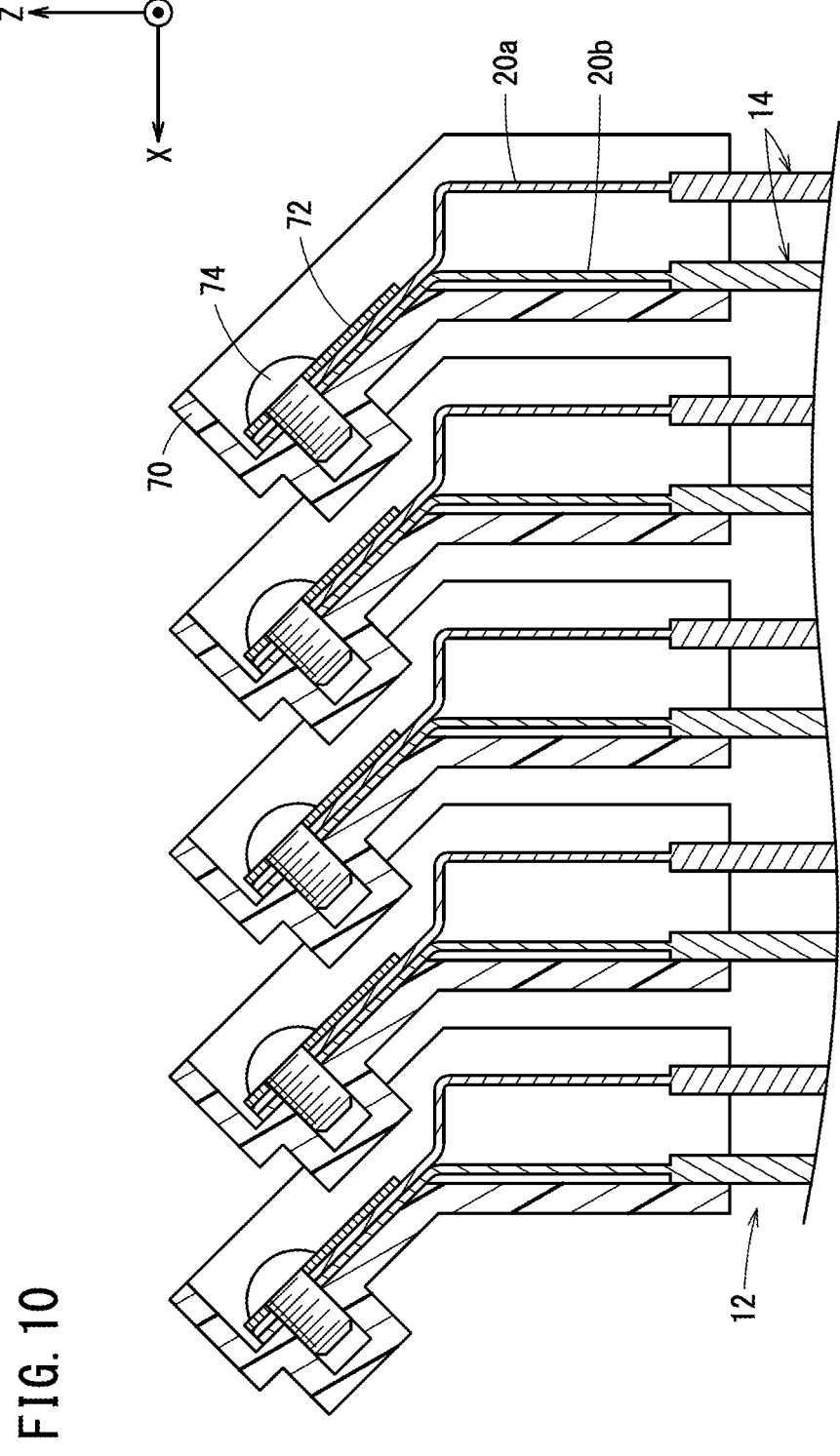
FIG. 10 is a cross-sectional view of the battery cell stack.

FIG. 8 is a perspective view of the battery cell stack 12. FIG. 9 is a perspective view of the battery cell stack 12. FIG. 10 is a cross-sectional view of the battery cell stack 12.

The positive electrode tab 20a of each battery cell 14 is connected to the negative electrode tab 20b of another adjacent battery cell 14 disposed on the positive side in the X-axis direction. The positive electrode tab 20a and the negative electrode tab 20b are stacked in the thickness direction. Each of the positive electrode tab 20a and the negative electrode tab 20b is bent to be inclined with respect to the X-axis direction. The X-axis direction is the same direction as the direction in which the battery cells 14 are stacked together. Each of the positive electrode tab 20a and the negative electrode tab 20b is bent to be inclined with respect to the Z-axis direction. The Z-axis direction is the same as the direction in which the first side 14a of each battery cell 14 and a second side 14b (FIG. 2) on the opposite side from the first side 14a are connected together.

In a state where the positive electrode tab 20a and the negative electrode tab 20b are sandwiched between a tab holder 70 and a retaining plate 72, the tab holder 70 and the retaining plate 72 are fastened to each other by screws 74.

[Configuration of Battery Frame]

Figure 11:
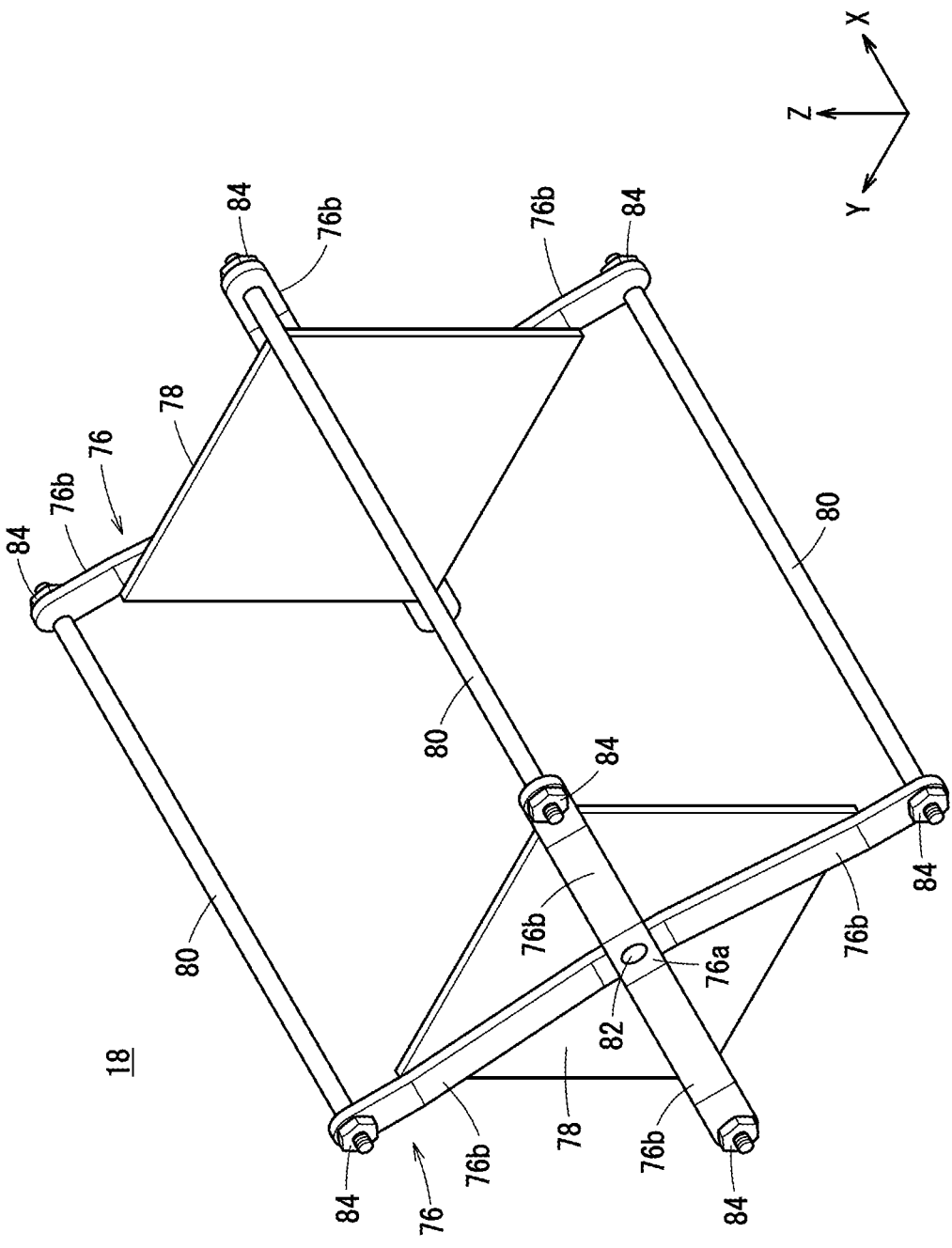
FIG. 11 is a perspective view of a battery frame.
Figure 12:
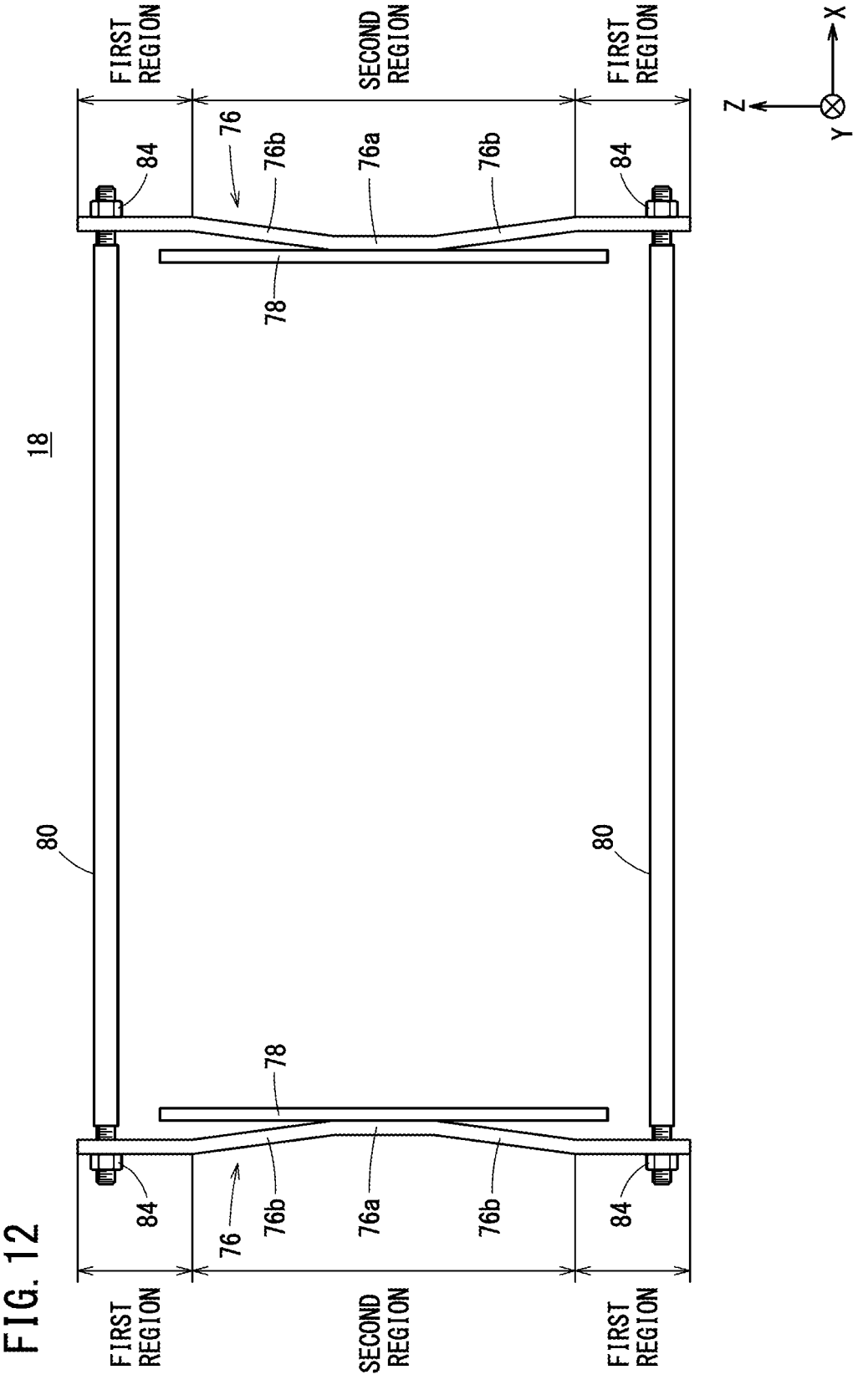
FIG. 12 is a side view of the battery frame.

FIG. 11 is a perspective view of the battery frame 18. FIG. 12 is a side view of the battery frame 18.

The battery frame 18 includes a pair of flat spring plates 76, a pair of pressing plates 78, and four connecting shafts 80.

The pair of pressing plates 78 are provided between the pair of flat spring plates 76. The battery cell stack 12 is provided between the pair of pressing plates 78 (FIG. 1). Each connecting shaft 80 extends in the X-axis direction. Each connecting shaft 80 connects the pair of flat spring plates 76.

Each flat spring plate 76 includes a central portion 76a and four arm portions 76b. Each arm portion 76b extends from the central portion 76a. Each arm portion 76b extends toward the outer side of the battery frame 18 in the X-axis direction so as to be oblique relative to the Z-axis direction.

Each flat spring plate 76 includes first regions and a second region. Each of the first region is a region of a tip portion of each arm portion 76b. The second region is a region other than the first regions. The second region includes the central portion 76a. In the X-axis direction, the second region is located on the further inward of the battery frame 18 than the first regions.

Each pressing plate 78 is attached to the central portion 76a of each flat spring plate 76. Each pressing plate 78 may be attached to the second region of the arm portions 76b of each flat spring plate 76. Each pressing plate 78 is attached to each flat spring plate 76 by a screw 82. Each pressing plate 78 may be attached to each flat spring plate 76 by welding.

In the Z-axis direction, the first regions of the arm portions 76b of each flat spring plate 76 overlap each pressing plate 78. In the Y-axis direction, the first regions of the arm portions 76b of each flat spring plate 76 overlap each pressing plate 78. The Z-axis direction and the Y-axis direction are the same as the direction orthogonal to the stacking direction of the battery cell stack 12.

The connecting shafts 80 are respectively attached to the first regions of the arm portions 76b of the flat spring plates 76. Adjustment bolts 84 are screwed into each connecting shaft 80 on the outer side of each flat spring plate 76. By tightening the adjustment bolts 84 in a state where the battery cell stack 12 is disposed between the pair of pressing plates 78, the pressure applied from the pair of pressing plates 78 to the battery cell stack 12 increases. By adjusting the amount of tightening of the adjustment bolts 84, the force applied to the battery cell stack 12 is set to 200 kPa to 400 kPa.

Advantageous Effects

In the battery cell stack 12 of the present embodiment, the battery cells 14 adjacent to each other in the X-axis direction are connected in series. The positive electrode tab 20a and the negative electrode tab 20b are stacked in the thickness direction of the positive electrode tab 20a and the negative electrode tab 20b. In this state, the positive electrode tab 20a and the negative electrode tab 20b are fastened to each other by the screws 74.

Figure 13:
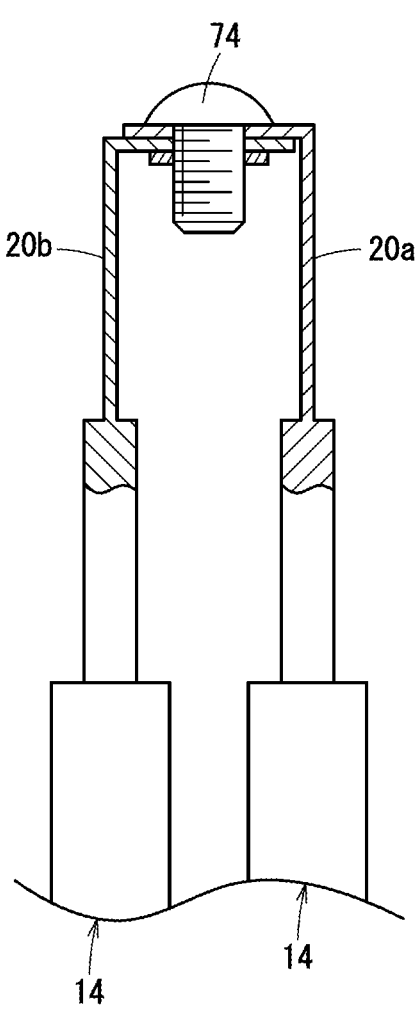
FIG. 13 is a schematic view showing a comparative example of a battery cell connection structure.
Figure 13:
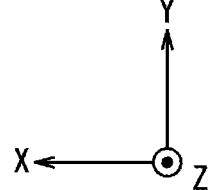

FIG. 13 is a schematic view showing a comparative example of the connection structure of the battery cells 14. In the comparative example shown in FIG. 13, the positive electrode tab 20a is bent at a right angle toward the negative electrode tab 20b of the adjacent battery cell 14. The negative electrode tab 20b is bent at a right angle toward the positive electrode tab 20a of the adjacent battery cell 14. In a state in which the positive electrode tab 20a and the negative electrode tab 20b are stacked in the Z-axis direction, the positive electrode tab 20a and the negative electrode tab 20b are fastened to each other by the screws 74.

The thickness of the battery cell 14, which is a laminated battery, is relatively thin with respect to the width of the head of the screw 74. Therefore, in the example of the connection structure of the battery cells 14 shown in FIG. 13, a gap is generated between the battery cells 14.

Figure 14:
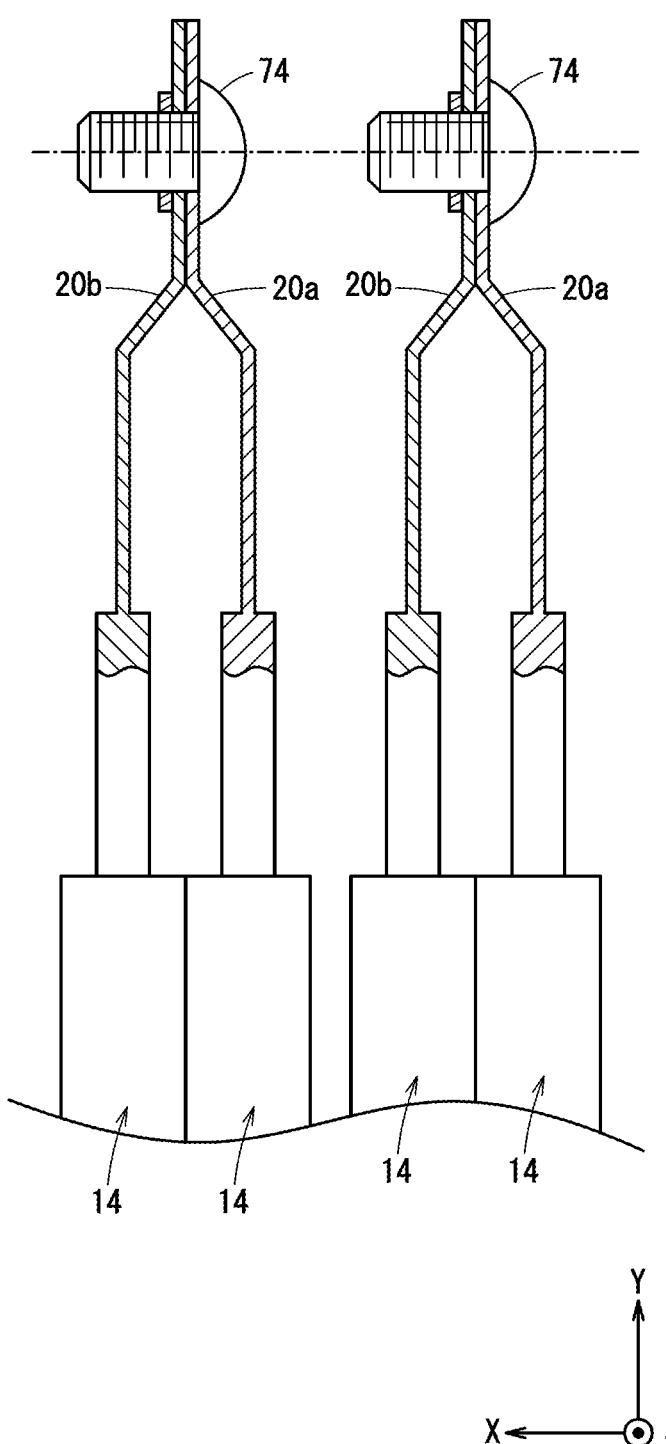
FIG. 14 is a schematic view showing a comparative example of the battery cell connection structure.

FIG. 14 is a schematic view showing a comparative example of the connection structure of the battery cells 14. In the comparative example shown in FIG. 14, the positive electrode tab 20a and the negative electrode tab 20b are fastened to each other by the screws 74 in a state in which the positive electrode tab 20a and the negative electrode tab 20b are stacked in the X-axis direction. Thus, the battery cells 14 can be brought into contact with each other.

In the battery cell stack 12, the battery cells 14 are stacked in the X-axis direction. In the example shown in FIG. 14, when the positive electrode tab 20a and the negative electrode tab 20b are fastened to each other by the screws 74, a tool for screwing the screws 74 interferes with another set of the positive electrode tab 20a and the negative electrode tab 20b.

Figure 15:
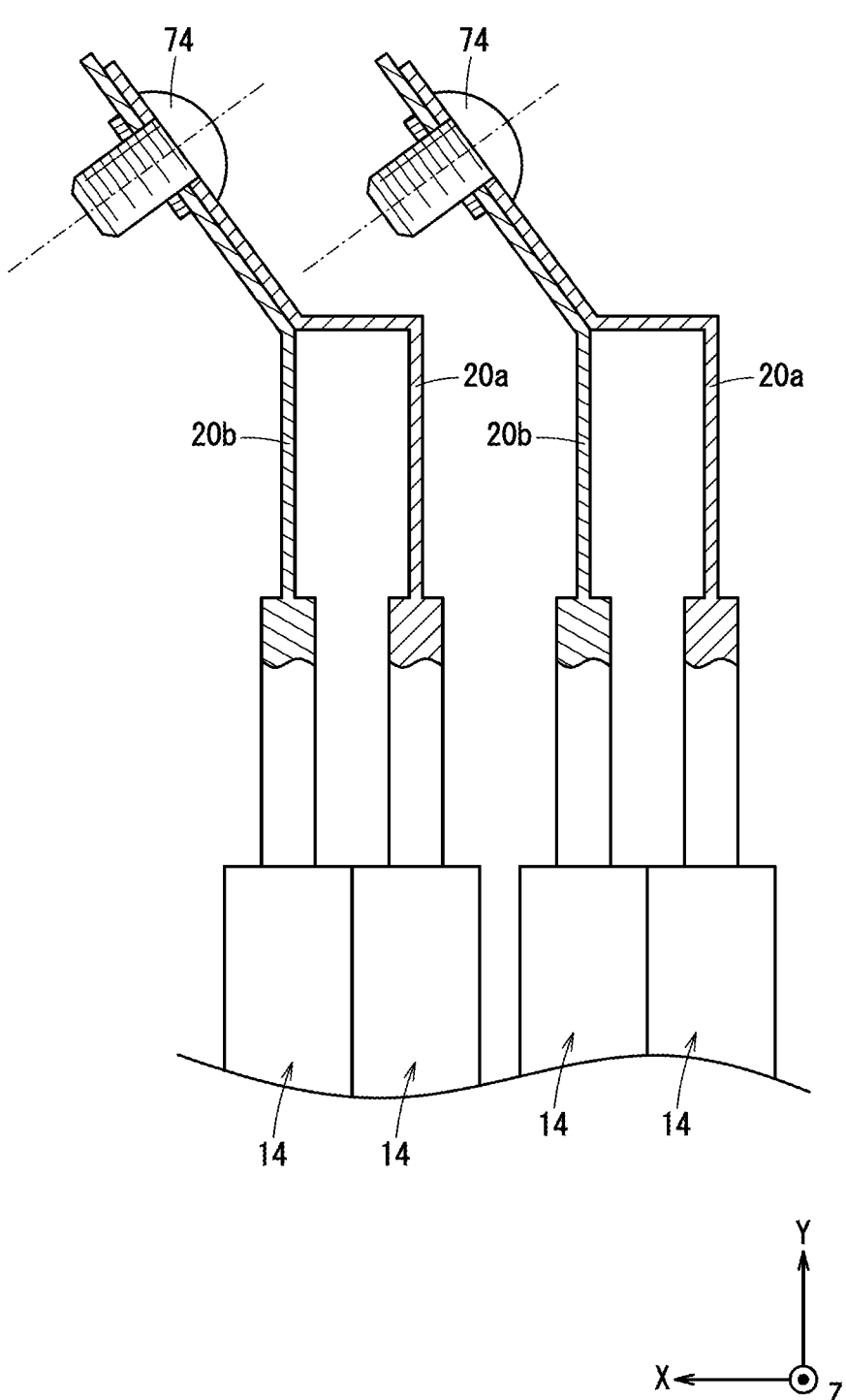
FIG. 15 is a schematic view showing an example of the battery cell connection structure.

FIG. 15 is a schematic view showing the connection structure of the battery cells 14 of the present embodiment. In the connection structure of the present embodiment, each of the positive electrode tab 20a and the negative electrode tab 20b is bent to be inclined with respect to the X-axis direction. Further, each of the positive electrode tab 20a and the negative electrode tab 20b is bent to be inclined with respect to the Z-axis direction. In this state, the positive electrode tab 20a and the negative electrode tab 20b are fastened to each other by the screws 74. Therefore, when the positive electrode tab 20a and the negative electrode tab 20b are fastened to each other by the screws 74, the tool does not interfere with another set of the positive electrode tab 20a and the negative electrode tab 20b.

In the connection structure of the battery cells 14 of the present embodiment, the tab holder 70 and the retaining plate 72 are fastened to each other by the screws 74 in a state where the positive electrode tab 20a and the negative electrode tab 20b are sandwiched between the tab holder 70 and the retaining plate 72. As a result, the positive electrode tab 20a and the negative electrode tab 20b can be reliably brought into contact with each other.

The present invention is not limited to the embodiment described above, and various configurations could be adopted therein without departing from the essence and gist of the present invention.

Invention Obtained from Embodiment

The invention that can be grasped from the above embodiment will be described below.

In the battery cell connection structure configured to connect the two battery cells (14) each having a rectangular shape in series in a state where the two battery cells are stacked in the thickness direction thereof, the positive electrode tab (20a) and the negative electrode tab (20b) are provided on the first side (14a) of the plurality of sides of each of the battery cells, the two battery cells are stacked in a state where the first sides thereof are oriented in the same direction, the positive electrode tab of one of the battery cells and the negative electrode tab of the other of the battery cells are connected to each other in a state of being stacked in the thickness direction, and the positive electrode tab of one of the battery cells and the negative electrode tab of the other of the battery cells are connected to each other in a state of being stacked in the thickness direction while the positive electrode tab and the negative electrode tab are bent to be inclined with respect to a direction in which the two battery cells are stacked and with respect to a direction in which the first side of each of the battery cells is connected to the second side (14b) of each of the battery cells, the second side being opposite from the first side. As a result, in a state where the positive electrode tab of the battery cell and the negative electrode tab of another battery cell are connected to each other, the distance between the battery cells can be shortened.

In the above-described battery cell connection structure, each of the battery cells may be a laminated battery. Thus, in a state where the positive electrode tab of the battery cell and the negative electrode tab of another battery cell are connected to each other, the distance between the battery cells can be shortened.

In the above-described battery cell connection structure, in a state where the positive electrode tab of one of the battery cells and the negative electrode tab of the other of the battery cells are sandwiched between the holder (70) and the plate (72), the plate and the holder are fastened to each other by the screw (74). As a result, the positive electrode tab and the negative electrode tab can be reliably brought into contact with each other.

The invention claimed is:

1. A battery cell connection structure configured to connect, in a state where a plurality of battery cells having a rectangular shape are stacked in a thickness direction thereof, adjacent battery cells of the plurality of battery cells in series, wherein each of the plurality of battery cells includes a positive electrode tab and a negative electrode tab provided on a first side of a plurality of sides thereof, the plurality of battery cells are stacked with the first sides being oriented in a same direction, a first electrode tab, which is one of the positive electrode tab and the negative electrode tab, includes a first inclined portion that inclines with respect to a stacking direction of the plurality of battery cells and a direction connecting the first sides and second sides opposite the first sides, a second electrode tab, which is another one of the positive electrode tab and the negative electrode tab, includes an extension portion that extends toward the first electrode tab of an adjacent battery cell, and a second inclined portion that extends along the first inclined portion of the first electrode tab of the adjacent battery cell from the extension portion, battery cells adjacent to each other in a state where the first inclined portion of the first electrode tab and the second inclined portion of the second electrode tab are overlapped and form a pair are connected in series, and in the stacking direction of the plurality of battery cells, the first inclined portions and the second inclined portions of a plurality of pairs are arranged at a regular interval.

2. The battery cell connection structure according to claim 1, wherein each of the battery cells is a laminated battery.

3. The battery cell connection structure according to claim 1, wherein in a state where the first inclined portion and the second inclined portion of one overlapped pair are sandwiched between a tab holder and a plate, the plate and the tab holder are fastened to each other by a screw.

4. The battery cell connection structure according to claim 3, wherein a fastening portion of the screw is positioned apart from the first sides in the stacking direction of the plurality of battery cells.

5. The battery cell connection structure according to claim 3, wherein a fastening portion of the screw that fastens the first inclined portion of one of a pair of battery cells and the second inclined portion of another of the pair of battery cells overlaps at least one of another pair of battery cells in the stacking direction of the plurality of battery cells.

6. The battery cell connection structure according to claim 3, wherein a head of the screw that fastens the first inclined portion of the first electrode tab of one of a pair of battery cells and the second inclined portion of the second electrode tab of another of the pair of the battery cells is disposed so as not to overlap the tab holder provided with respect to another pair of battery cells when viewed from an axial direction of the screw.

7. The battery cell connection structure according to claim 1, wherein the first inclined portion and the second inclined portion are formed by the positive electrode tab and the negative electrode tab being bent at a same angle so as to extend in an oblique direction with respect to the stacking direction of the plurality of battery cells and the direction connecting the first sides and second sides.

8. The battery cell connection structure according to claim 1, further comprising a tab holder that contacts one of the first inclined portion or the second inclined portion, wherein the first inclined portion and the second inclined portion are formed by the positive electrode tab and the negative electrode tab being bent at a same angle so as to extend in an oblique direction with respect to the stacking direction of the plurality of battery cells and the direction connecting the first sides and second sides, and the tab holder is formed so as to extend along the first inclined portion and the second inclined portion.

* * * * *